HYDRAULIC TURBINES OR PUMPS

Original Filed April 8, 1963 3 Sheets-Sheet 1

INVENTOR.
ROBERT S. SPROULE
BY Raymond A. Paquin
ATTORNEY

HYDRAULIC TURBINES OR PUMPS

Original Filed April 8, 1963 3 Sheets-Sheet 2

INVENTOR.
ROBERT S. SPROULE
BY Raymond A. Fagin
ATTORNEY.

HYDRAULIC TURBINES OR PUMPS

Original Filed April 8, 1963 3 Sheets-Sheet 3

INVENTOR.
ROBERT S. SPROULE
BY
Raymond A. Paquin
ATTORNEY.

United States Patent Office

Re. 26,095
Reissued Oct. 11, 1966

26,095

HYDRAULIC TURBINES OR PUMPS

Robert S. Sproule, Montreal, Quebec, Canada, assignor to Dominion Engineering Works, Limited Original No. 3,176,960, dated Apr. 6, 1965, Ser. No. 271,304, Apr. 8, 1963. Application for reissue Oct. 6, 1965, Ser. No. 500,463
3 Claims. (Cl. 253—148)

Matter enclosed in heavy brackets [ ] appears in the original patent but forms no part of this reissue specification; matter printed in italics indicates the additions made by reissue.

This invention relates to hydraulic turbines, pumps, and the like, having variable-pitch rotor blades, and has particular reference to variable-pitch hydraulic machines of the type set forth in which blade-tip clearance is maintained constant at all pitch settings by use of a spherical throat ring and blade tips machined to a spherical envelope.

In contemporary machines of the type set forth, the throat ring is divided in its median plane in order to permit assembly of the rotor into the throat ring. In large vertical machines, the bottom half of the spherical throat ring is embedded in concrete, the rotor is lowered into position and, then, the top half of the spherical throat ring is lowered over the rotor, seated on the bottom half, and bolted in place. This construction is expensive and lacks the rigidity of the completely grouted-in throat ring.

An attempted compromise has been to make the throat ring cylindrical down to the median plane and spherical below this plane, the entire one-piece throat ring being embedded in concrete. This form of construction allows axial assembly of the rotor into the throat ring, but results in large gaps between the blade tips and the cylindrical portion of the throat ring when the blades are in coarse pitch. These gaps permit leakage which lowers the efficiency of the machine.

It is an object of the present invention to provide a new and improved method for axially assembling the rotor or runner assembly into, or removing it from, a hydraulic machine having a grouted-in throat ring.

Another object of the invention is to provide a new and improved method of the type set forth for assembling the rotor into, or removing it from, a one-piece throat ring.

Another object of the invention is to provide a new and improved grouted-in throat ring for hydraulic turbines, pumps, and the like.

Another object of the invention is to provide a new and improved throat ring for hydraulic turbines, pumps, and the like, with a rotor or runner assembled therein.

Other objects and advantages of the invention will be apparent from the following description, taken in connection with the accompanying drawings. It will be understood that changes may be made in the details of construction and arrangement of parts shown and described, as the preferred form of the invention has been given by way of illustration only.

Referring to the drawings:

*FIGURE 1 illustrates a turbine embodiment according to the prior art wherein the one-piece throat ring 16' is of cylindrical form above the median line 22A of the rotor, and is of spherical form for the lower portion of the throat ring, below the median line 22A.*

Figure 1:
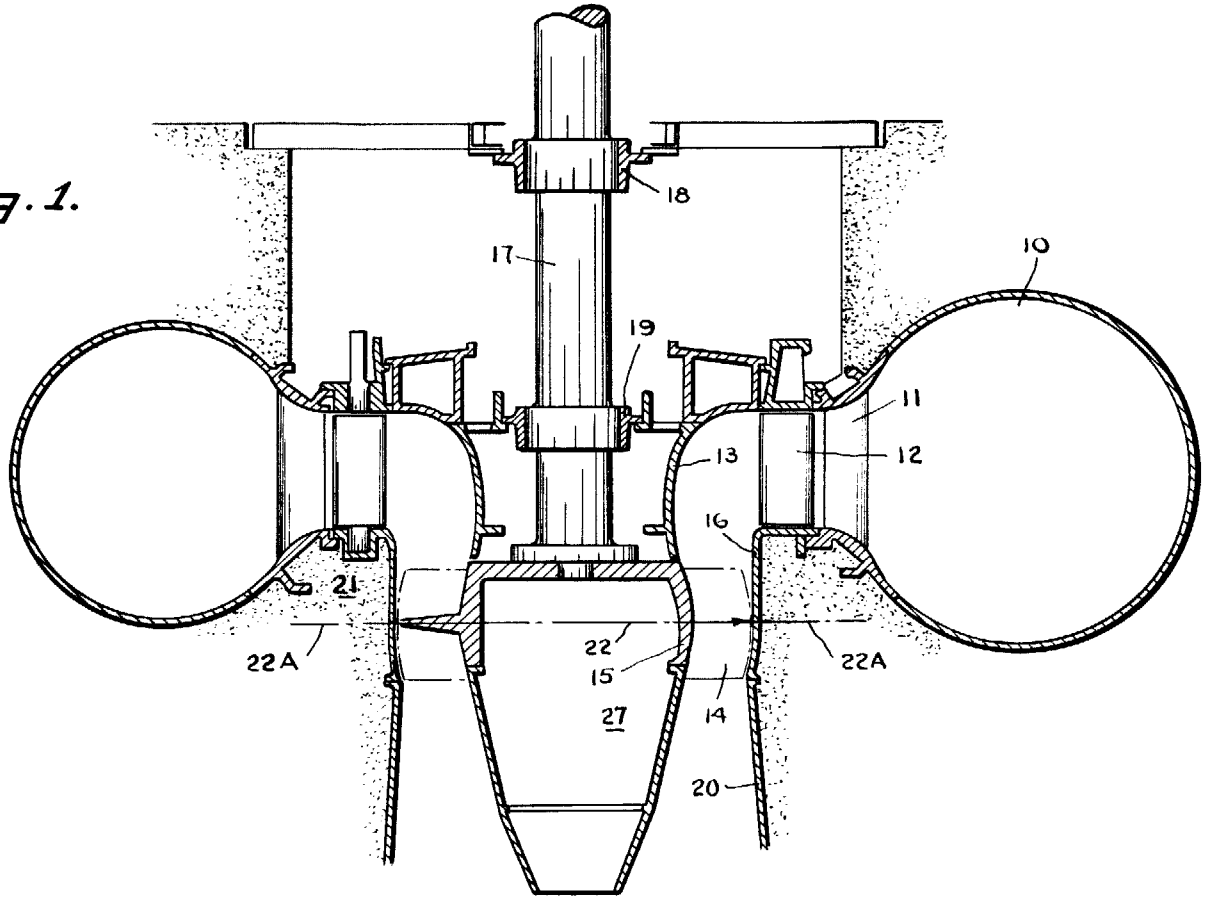
FIG. 1 is a diametral vertical sectional view of a hydraulic turbine of the variable-pitch propeller type having a throat ring of cylindrical form above, and of spherical form below, the median plane of the runner *according to prior art;*

Referring more particularly to the drawings, wherein similar reference characters designate corresponding parts throughout, water flows, in the operation of the hydraulic machine shown, through spiral casing 10 from penstock or other water supply source, and is directed by fixed stay vanes 11 and adjustable wicket gates 12.

Figure 2:
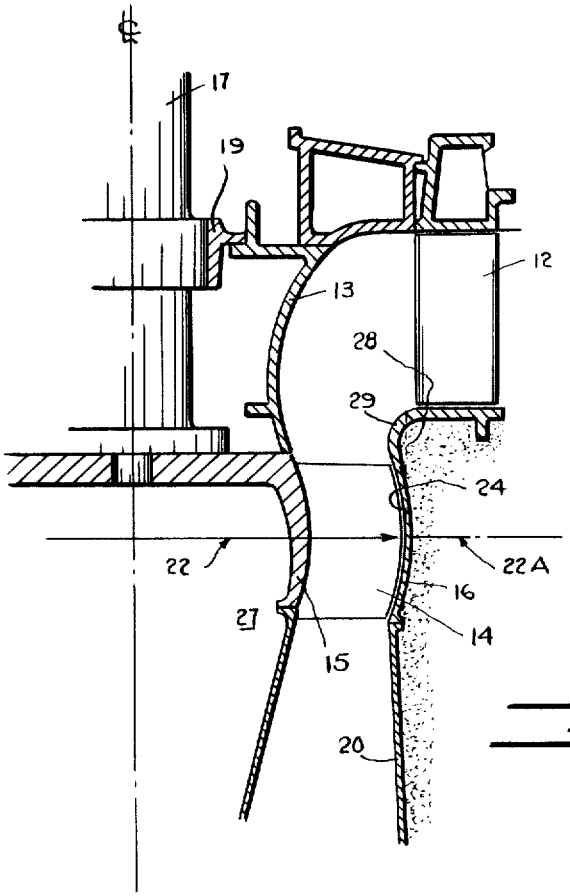
FIG. 2 is a fragmentary radial vertical section of a hydraulic machine with variable-pitch rotor blades running in a spherical throat ring *according to the present invention.

With particular reference to FIG. 2, head-cover extension 13 guides the water through the annular space between runner hub 15 and throat ring 16, in which annular space runner blades 14 rotate. The water is then discharged by way of draft tube 20. Runner assembly or rotor 27 is attached to shaft 17, which shaft 17 is journaled in guide bearings 18 and 19.

Throat ring 16 is of one-piece construction and is permanently embedded in concrete foundation 21 prior to installation of rotor 27. Said throat ring is characterized by having a spherical bore 24 *and as is best seen in FIG. 2 has a top face adjacent the gates 12 and a bottom face adjacent the draft tube 20.*

Figure 3:
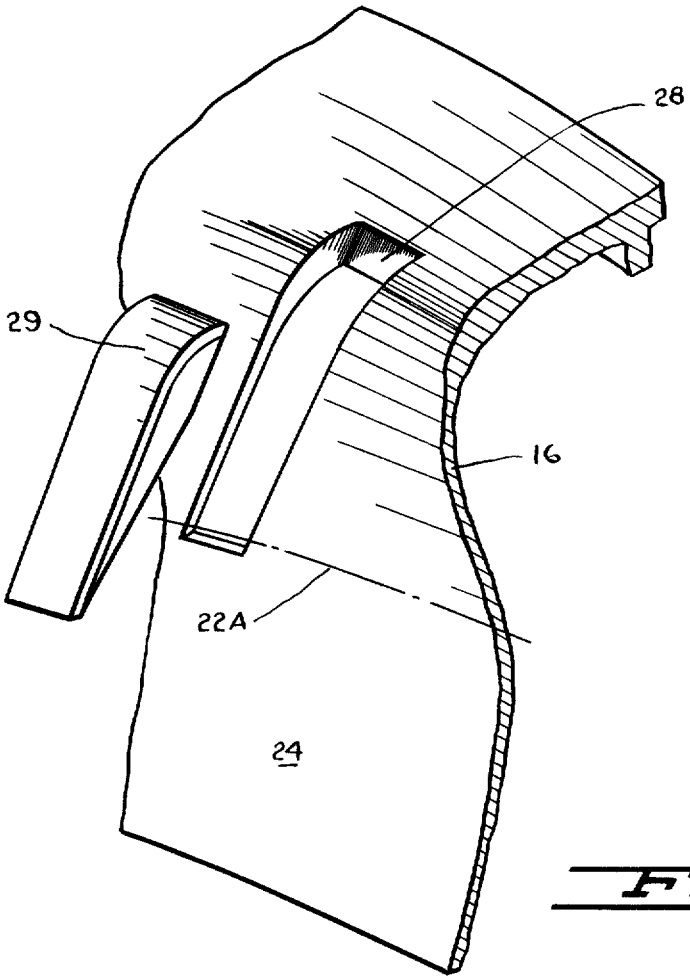
* and FIG. 3 is an isometric view of a fragmentary portion of the spherical throat ring showing a form of the invention in relation thereto.

The maximum diameter 22 of rotor 27 is greater than the bore 24 *or inner annular surface* of throat ring 16 above median plane 22A. In order to make axial introduction of runner assembly or rotor 27 into throat ring 16 possible, slots 28, see FIGS. 2 and 3, are formed in throat ring 16, one of said slots 28 being formed for each one of the rotor blades 14, such that the tips of said rotor blades may pass in an axial direction through the constricted portion of throat ring 16 on their way to median plane 22A.

For each of said slots 28, a filler piece or other closure member 29 is provided. Said filler pieces are fixed into slots 28 after rotor 27 has been located in its operating position at median plane 22A.

In installations where it is desirable to install rotor 27 from below the median plane, slots 28 and filler pieces 29 would, of course, be appropriately located.

With more particular regard to the new and improved method provided by me for axially assembling the rotor or runner assembly 27 into, or removing it from, the completely grouted-in, one-piece throat ring 16, such method comprises providing slots 28 in the constricted portion of throat ring 16, said slots being of such number as to correspond to the number of rotor blades 14, and passing the rotor or runner assembly 27 through such constricted portion of said throat ring by passing the tips of said rotor blades through said slots. After rotor 27 has been installed in its appropriate position, slots 28 are then filled in by filler pieces or other closure members 29.

It will be understood that, although the invention has been illustrated and described in relation to a hydraulic turbine, its application is not limited to such but, rather is equally applicable to other hydraulic machines in which blade-tip clearance is maintained constant at all pitch settings by use of a spherical throat ring and blade tips machined to a spherical envelope.

The operation of the device is believed to be apparent from the foregoing.

From the foregoing, it will be seen that I have provided new and improved means and method for accomplishing all of the objects and advantages of the invention.

What I claim as new and desire to secure by Letters Patent of the United States is:

*1.* A hydraulic machine comprising a rotor having variable pitch rotor blades and a stator having a single piece spherical throat ring embedded in concrete and surrounding said rotor blades, said rotor blades having tip ends corresponding in contour with the internal surface of said throat ring such that a constant clearance is maintained between the tips of said blades and said throat ring at all pitch settings, a constricted portion in said throat ring at all pitch settings, a constricted portion in said throat ring of lesser diameter than the overall tip diameter of said rotor blades, said throat ring being provided with a plurality of slots extending substantially parallel to the axis of rotation of said rotor along the constricted portion of the throat ring at least to the median plane of said throat ring, each slot being dimensioned to permit the passage of a rotor blade tip therealong whereby the rotor may be installed or removed from the stator, and filler means for closing said slots when the rotor is installed in the stator.

*2. A throat ring for use in a hydraulic machine having a bladed runner of the propeller type, wherein the tips of the blades of said runner are of curved form, comprising; a substantially annular ring having a top face, a bottom face and an inner annular curved surface therebetween adapted to provide a running clearance with the curved tips of said runner when assembled, said curved surface including a constricted portion of said throat ring having a lesser diameter than the overall tip diameter of said rotor blades; and a plurality of circumferentially arranged slots in said annular surface adapted to receive the blade tips of said runner to permit assembly of said runner within said throat ring, said slots being adapted to receive closing means therein, upon assembly of the runner within the throat ring.*

*3. A throat ring for use in a hydraulic machine having a bladed runner of the propeller type, wherein the tips of the blades of said runner are of curved form, comprising; a substantially annular ring having a top face, a bottom face and an inner annular curved surface therebetween adapted to provide a running clearance with the curved tips of said runner when assembled, said curved surface including a constricted portion of said throat ring having a lesser diameter than the overall tip diameter of said rotor blades; and a plurality of circumferentially arranged slots in said annular surface extending from a face of said ring and adapted to receive the blade tips of said runner to permit assembly of said runner within said throat ring, said slots being adapted to receive closing means therein, upon assembly of the runner within the throat ring.*

References Cited by the Examiner

The following references, cited by the Examiner, are of record in the patented file of this patent or the original patent.

UNITED STATES PATENTS

| | | | |
|---|---|---|---|
| 1,877,048 | 9/1932 | Popp | 253—148 |

FOREIGN PATENTS

| | | |
|---|---|---|
| 1,104,025 | 1/1955 | France. |
| 348,032 | 5/1931 | Great Britain. |

MARTIN P. SCHWADRON, *Primary Examiner.*

E. A. POWELL, JR., *Assistant Examiner.*